United States Patent
Kumagai et al.

(10) Patent No.: US 7,274,802 B2
(45) Date of Patent: Sep. 25, 2007

(54) AUTOMATIC TRACKING APPARATUS FOR REFLECTOR

(75) Inventors: Kaoru Kumagai, Tokyo (JP); Masahiro Saito, Tokyo (JP); Shinji Yamaguchi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 729 days.

(21) Appl. No.: 10/718,436

(22) Filed: Nov. 20, 2003

(65) Prior Publication Data

US 2004/0101164 A1 May 27, 2004

(30) Foreign Application Priority Data

Nov. 22, 2002 (JP) .............................. 2002-339346

(51) Int. Cl.
*G06K 9/00* (2006.01)
(52) U.S. Cl. ...................... 382/106; 382/103; 382/266; 356/4.01
(58) Field of Classification Search ................ 382/106, 382/266, 154; 356/139.08, 139.04, 4.01; 250/200
See application file for complete search history.

(56) References Cited

U.S. PATENT DOCUMENTS

| | | | | |
|---|---|---|---|---|
| 4,965,840 A | * | 10/1990 | Subbarao | 382/106 |
| 5,193,124 A | * | 3/1993 | Subbarao | 382/255 |
| 5,589,939 A | * | 12/1996 | Kitajima | 356/622 |
| 5,600,123 A | * | 2/1997 | Purrazzella | 250/203.3 |
| 5,770,850 A | * | 6/1998 | Bowen et al. | 250/203.1 |
| 6,445,446 B1 | * | 9/2002 | Kumagai et al. | 356/139.04 |
| 6,559,931 B2 | * | 5/2003 | Kawamura et al. | 356/4.01 |
| 6,826,293 B2 | * | 11/2004 | Matsunaga | 382/106 |
| 6,907,133 B2 | * | 6/2005 | Gotoh | 382/106 |
| 7,010,157 B2 | * | 3/2006 | Kochi et al. | 382/154 |

FOREIGN PATENT DOCUMENTS

JP 05-322569 12/1993

\* cited by examiner

*Primary Examiner*—Joseph Mancuso
*Assistant Examiner*—Andrae Allison
(74) *Attorney, Agent, or Firm*—Chapman and Cutler LLP (57) ABSTRACT

The present invention comprises an illumination portion (11), and, a light receiving portion (12) having an image sensor (27) which are disposed in a surveying machine body (8), arithmetic portion (38) for calculating a position of a reflection light image (MO) from a reflector (2) in an area of the image sensor (27) based on a received light of the image sensor (27), a rotation mechanism for rotating the surveying machine body (8) so as to position the reflector (2) on a light receiving optical axis of the light receiving portion (12) based on the position obtained by the arithmetic portion (38), a storing portion (45) for storing a quantity of light of each pixel in the image sensor (27), and an edge position detecting portion (46) for detecting a beginning edge position (La) and end edge potion (Lb) of the reflection light image (MO) every scanning line in the image sensor (27).

6 Claims, 7 Drawing Sheets

AUTOMATIC TRACKING APPARATUS FOR REFLECTOR

FIELD OF THE INVENTION

The present invention relates to an automatic tracking apparatus for a reflector which illuminates measurement light toward a reflector, and seeks an arrival direction of the measurement light reflected on the reflector, and then tracks the reflector automatically.

DESCRIPTION OF THE RELATED ART

Conventionally, an automatic tracking apparatus for a reflector, which comprises an eyepiece portion for collimating a corner cube as a reflector and a range finding portion for measuring a distance to the reflector, and scans the reflector in horizontal and vertical directions so as to track the reflector automatically by a surveying machine body, has been well known. (For example, Japanese Patent Laid Open H05-322569)

Recently, at the request of lowering a price, there has been developed an automatic tracking apparatus for a reflector in which an illumination portion for illuminating measurement light toward a reflector and a light receiving portion having an image sensor such as a CCD for receiving a reflection light image of the measurement light illuminated toward the reflector are provided in a surveying machine body.

However, in this type of automatic tracking apparatus, in order to obtain a position of reflection light image precisely, if processing for detecting a position of the weighted average is adopted, a position of the weighted average of a reflection light image has to be obtained by carrying out arithmetic processing for all pixels from a first pixel on a first horizontal scanning line to a last pixel on a last horizontal scanning line in an image sensor, and it requires much time for calculating the position of the weighted average, and if a time for ordering tracking after obtaining the position of the weighted average is delayed, the trucking is disturbed.

SUMMARY OF THE INVENTION

The present invention has been made in view of aforementioned problem, it is, therefore, an object of the present invention to provide an automatic tracking apparatus for a reflector even thought an illumination portion for illuminating a measurement light toward a reflector and a light receiving portion having an image sensor for receiving a reflection light image of the measurement light illuminated toward the reflector are provided in a surveying machine body, the automatic tacking apparatus can carried out tracking without being disturbed.

According to a first aspect of the present invention, an automatic tracking apparatus for a reflector comprises a surveying machine body, an illumination portion disposed in a surveying machine body for illuminating a measurement light toward a reflector, a light receiving portion which is disposed in the surveying machine body and which has an image sensor for receiving the reflection light image of the measurement light illuminated toward the reflector, arithmetic means for calculating a position of the reflection light image from the reflector in an area of said image sensor based on the received light of said image sensor, a rotation mechanism for rotating the surveying machine body so as to position the reflector on a light receiving optical axis of the light receiving portion based on the position obtained by the arithmetic means, a storing portion for storing a quantity of light at each pixel in the image sensor, and an edge position detecting portion for detecting beginning edge and end edge positions of the reflection light image at each scanning line of the image sensor, and in accordance with an output of the edge position detecting portion, the arithmetic means calculates a quantity of light at each pixel from the storing portion and positions of the weighted average in the horizontal and vertical directions of the reflection light image.

According to a second aspect of the present invention, the automatic tracking apparatus for the reflector reads out the quantity of light at each pixel from the storing portion, and a width between the beginning edge position and the end edge position at each scanning line is obtained by calling out the positions from the edge position detecting portion, and a scanning line corresponding to the widest line is decided as the position of the weighted average in the vertical direction, and calculates the position of the weighted average in the horizontal direction of the reflection light image based on the quantity of light of the pixel which is existed between the beginning edge position and the end edge position in the scanning line corresponding to the widest line.

According to a third aspect of the present invention, an automatic tracking apparatus for a reflector comprises a surveying machine body, an illumination portion, which is disposed in the surveying machine body, for illuminating a measurement light toward a reflector, a light receiving portion, which is disposed in the surveying machine body, having an image sensor for receiving the measurement light from the reflector, arithmetic means for calculating a position of reflection light image from the reflector in an area of the image sensor based on a received light of the image sensor, a rotation mechanism for rotating the surveying machine body so as to position the reflector on a light receiving optical axis of the light receiving portion based on the position obtained by the arithmetic means, a first storing portion for storing the quantity of received light of the measurement light from said reflector in scanning, and a second storing portion for storing the quantity of received light after binarizing, and the arithmetic means detects the position of the reflection light image from the quantity of received light which is stored in the first storing portion and the quantity of received light which is binarized and stored in the second storing portion.

DESCRIPTION OF THE PREFERED EMBODIMENTS

Embodiment 1

Figure 1:
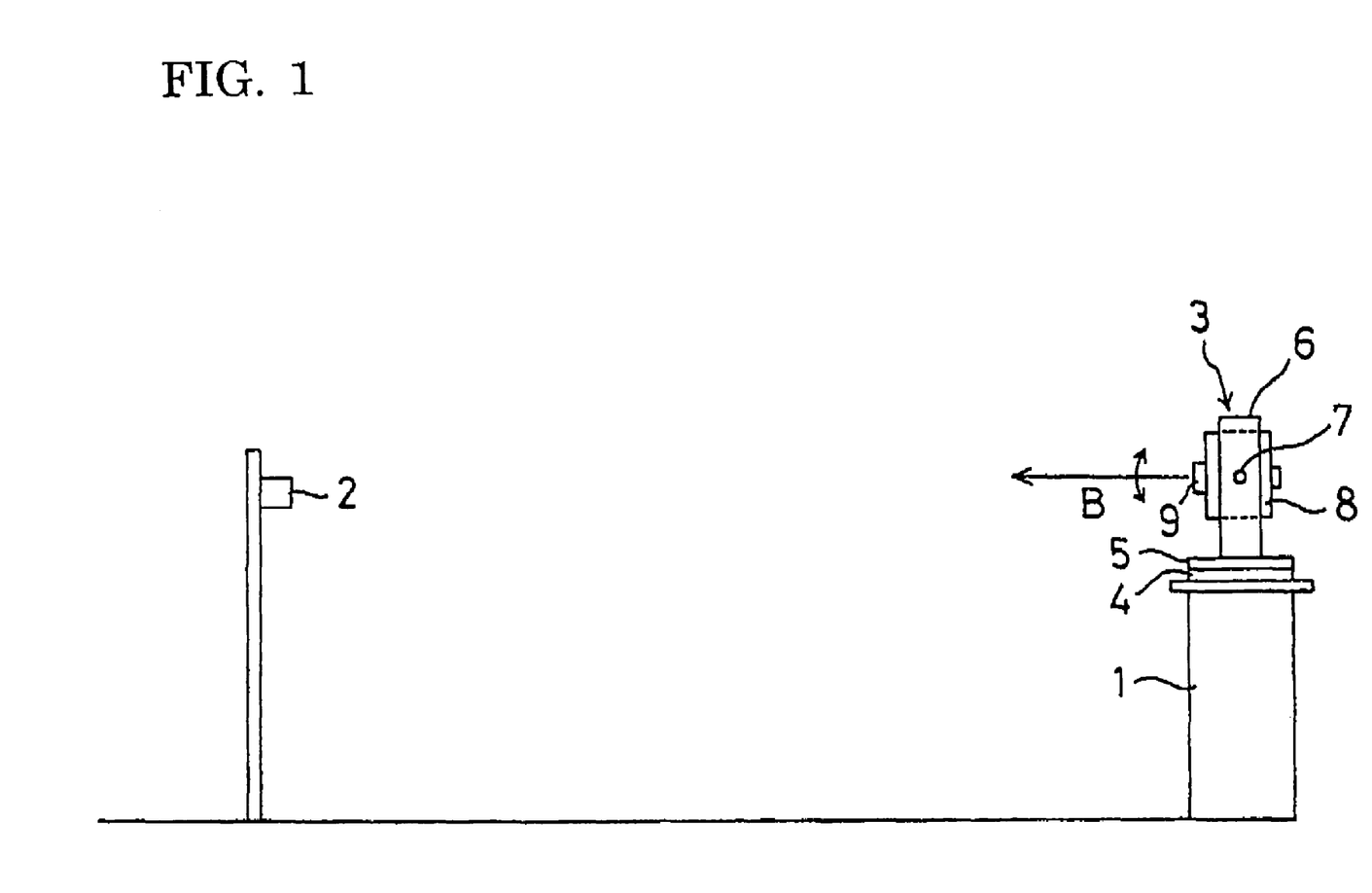
FIG. 1 is a side view showing a setting condition of an automatic tracking apparatus for a reflector according to the present invention.

In FIG. 1, reference numeral 1 denotes a surveying pedestal and reference numeral 2 a corner cube as a reflector placed at a point to be measured. This surveying pedestal 1 is provided with a surveying machine 3. This surveying machine 3 comprises a fixing board 4 and a horizontal rotation portion 5. The fixing board 4 is provided with a known rotation mechanism (not shown) for rotating the horizontal rotation portion 5.

Figure 2:
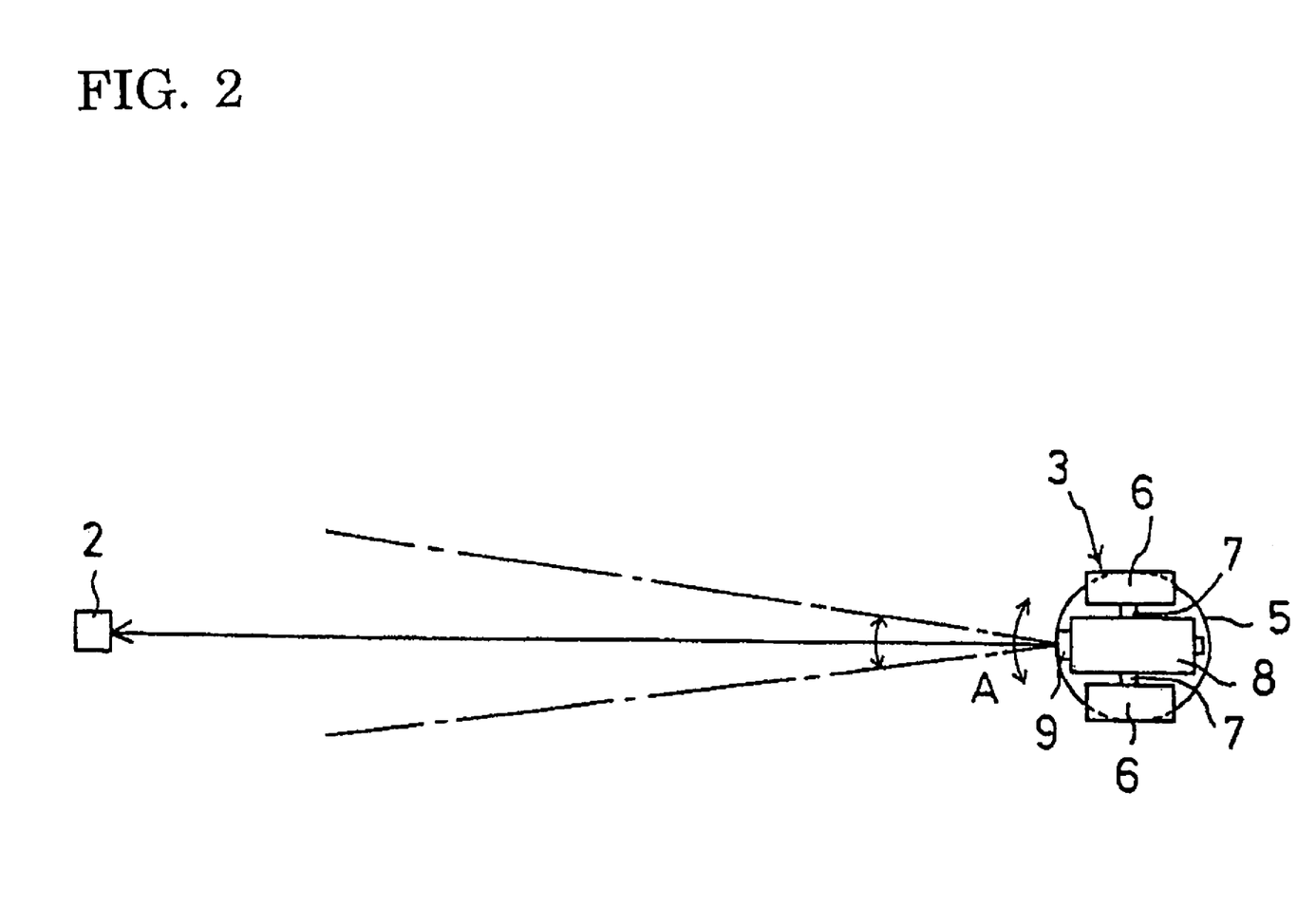
FIG. 2 is a plan view showing a setting condition of an automatic tracking apparatus for a reflector according to the present invention.

As shown in FIG. 2, the horizontal rotation portion 5 is rotated in the direction of arrow A relative to the fixing board 4. The horizontal rotation portion 5 comprises a supporting portion or carrying portion 6. A vertical direction rotation shaft 7 is mounted on the supporting portion 6, and a known rotation mechanism (not shown) for rotating the vertical direction rotation shaft 7 is provided in the inside of the supporting portion 6. A surveying machine body 8 is mounted on the vertical direction rotation shaft 7. The surveying machine body 8 is rotated in the horizontal direction by a rotation of the horizontal rotation portion 5, and also is rotated in the vertical direction by a rotation of the vertical direction rotation shaft 7 shown by the arrow B in FIG. 1.

Figure 3:
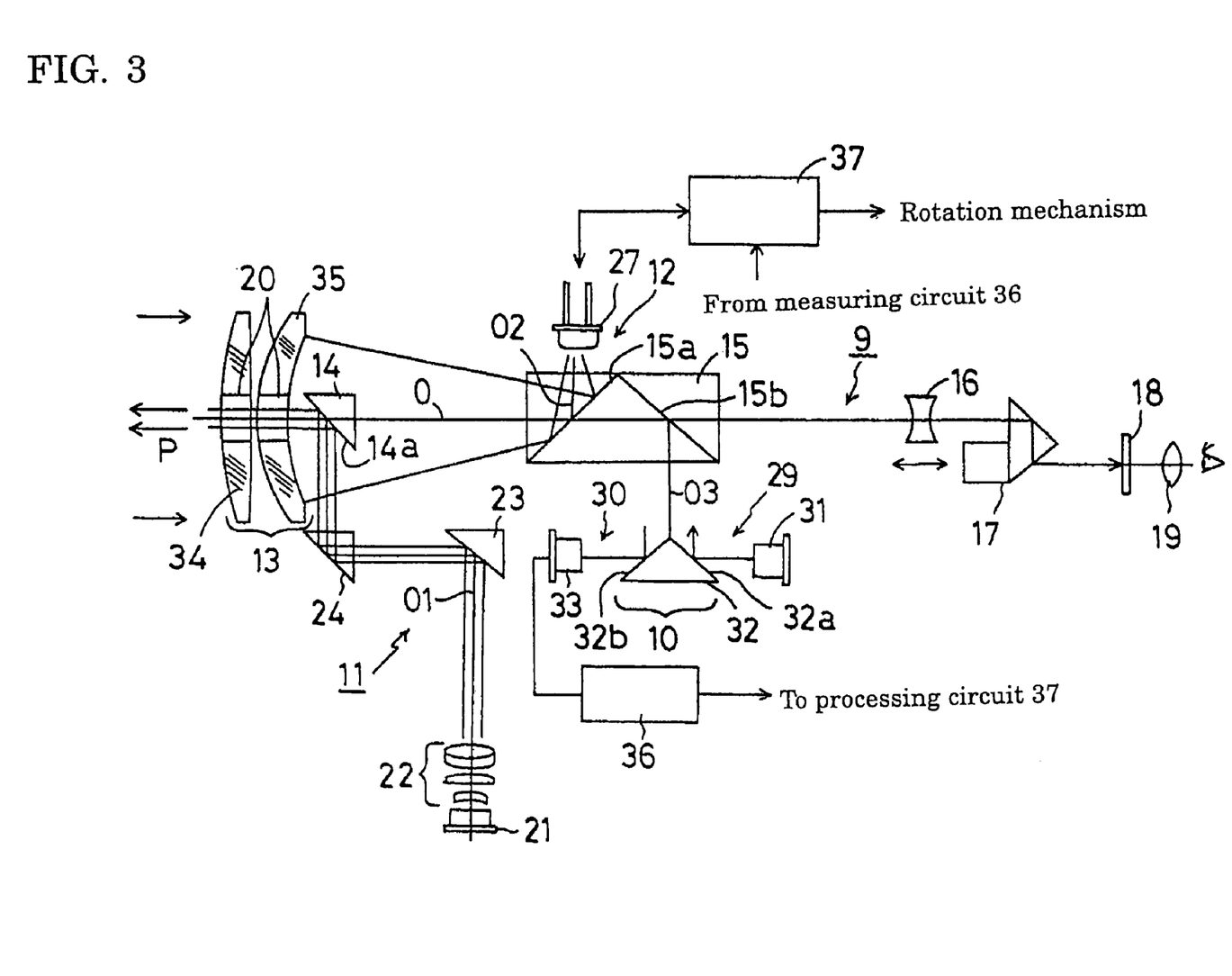
FIG. 3 is an explanation view showing an optical portion of an automatic tracking apparatus for a reflector according to the present invention.

In the surveying machine body 8, as shown in FIG. 3, there are provided with a collimation optical portion 9, a range finding optical portion 10, an illumination portion 11, and a light receiving portion 12. The collimation optical portion 9 is one for collimating the corner cube 2, and comprises an objective lens 13, a reflection mirror 14, a dichroic prism 15, a focusing lens 16, a Porro prism 17, a focal point mirror 18, and an eyepiece 19.

The objective lens 13 includes a penetration part 20. The reflection mirror 14 constructs part of the illumination portion 11. The illumination portion 11 comprises a laser diode 21, a collimator lens 22, and reflection mirrors 23, 24. The laser diode 21 ejaculates an infrared laser beam P (900 nm of wave length) as a measurement light, and the infrared laser beam P is changed to a parallel pencil by the collimator lens 22.

Figure 4:
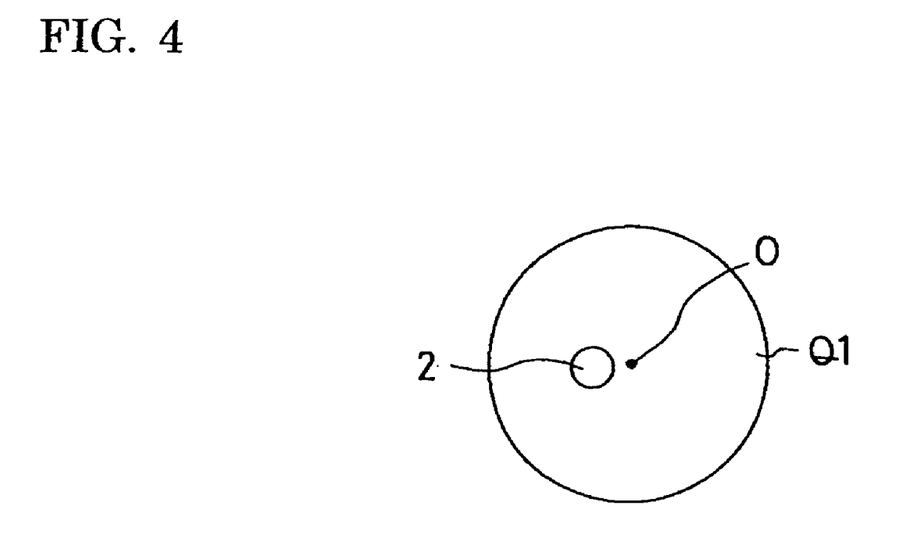
FIG. 4 is a view showing an example of an illumination area of measurement light by an illumination portion according to the present invention.

The reflection mirror 14 is for bringing an optical axis O1 of the illumination portion 11 into line with an optical axis O, and has a reflection face 14a. The infrared laser beam P is reflected on the reflection mirrors 23, 24, and is led to the objective lens 13, and then is emitted to an outside through the penetration portion 20, and is illuminated toward the corner cube 2. FIG. 4 shows an illumination area Q1 of the laser beam P.

The infrared laser beam P which is reflected on the corner cube 2 is condensed by the whole area of the objective lens 13, and is led to the dichroic prism 15. The dichroic prism 15 includes reflection faces 15a, 15b.

The reflection face 15a reflects the infrared laser beam P toward the light receiving portion 12. The light receiving portion 12 comprises an image sensor 27. An optical axis O2 of the light receiving portion 12 is aligned with the optical axis O of the objective lens 13.

The range finding portion 10 is composed of a light projecting system 29 and a light receiving system 30, and the light projecting system 29 includes a laser light source 31 and the light receiving system 30 includes a photosensitive device 33. A triangle prism 32 is disposed between the light projecting system 29 and the light receiving system 30. The laser light source 31 emits an infrared laser light wave as a distance measuring luminous flux. A wave length of its infrared laser light wave is 800 nm, and the wave length is different from the wave length of the infrared laser light P.

The infrared laser light wave is reflected on a reflection face 32a of the triangle prism 32, and is led to the reflection face 15b of the dichroic prism 15. This reflection face 15b transmits light of a visualized area, and reflects light of an infrared area including light with a wavelength of 800 nm.

The infrared laser light wave which is led to the reflection face 15b is emitted as a plane wave to the outside of the surveying machine body 8 by passing through a lower half area 34 of the objective lens 13 after transmitting the reflection face 15a. The infrared laser light wave is reflected on the corner cube 2, and returns to the objective lens 13, and is condensed by an upper half area 35 of the objective lens 13. After that, the infrared laser light wave is led to the reflection face 15b after transmitting the reflection face 15a of the dichroic prism 15, and then is led to a reflection face 32b of the triangle prism 32 by this reflection face 15b, and is reflected on this reflection face 32b, and then is converged on the photosensitive device 33.

An output of light receiving of the photosensitive device 33 is input in a known measuring circuit 36, and the measuring circuit 36 calculates a distance from the surveying machine body 8 to a corner cube 2. The distance from the surveying machine body to the corner cube 2 is thereby measured.

A luminous flux of a visualized area is led to the focal point mirror 18 through the objective lens 13, the dichroic prism 15, the focusing lens 16, and the Porro prism 17, and including a vicinity of the corner cube 2, an image of the vicinity is formed on the focal point mirror 18 by adjusting the focusing lens 16. A worker can collimate the corner cube 2 by looking into a visualized image, which is imaged on the focal point mirror 18 through the eyepiece 19.

Figure 5:
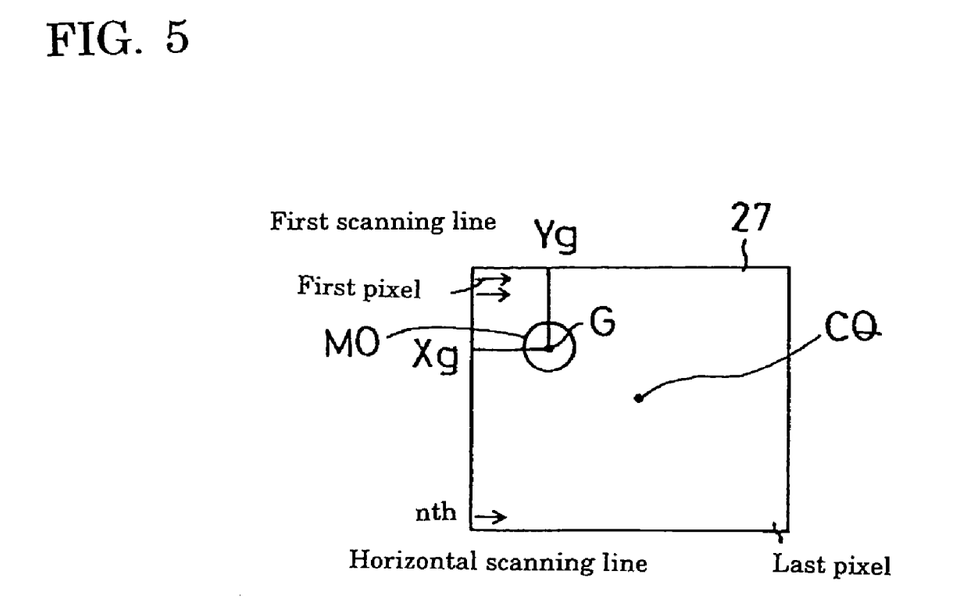
FIG. 5 is an explanation view showing an example of a reflection light image formed on an image sensor according to the present invention.
Figure 6:
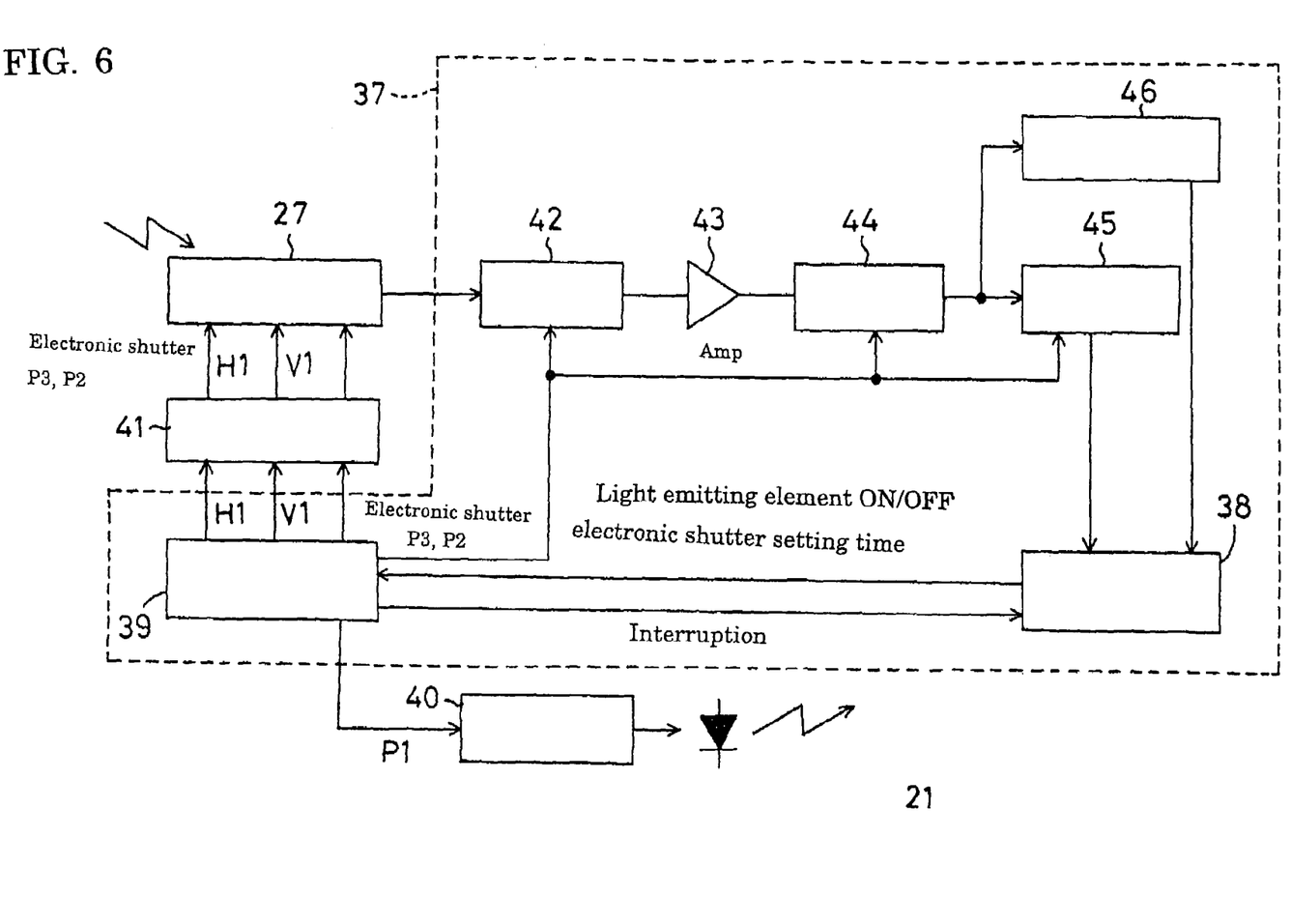
FIG. 6 is a circuit block diagram showing an example of processing circuit according to an embodiment of the present invention.
Figure 7:
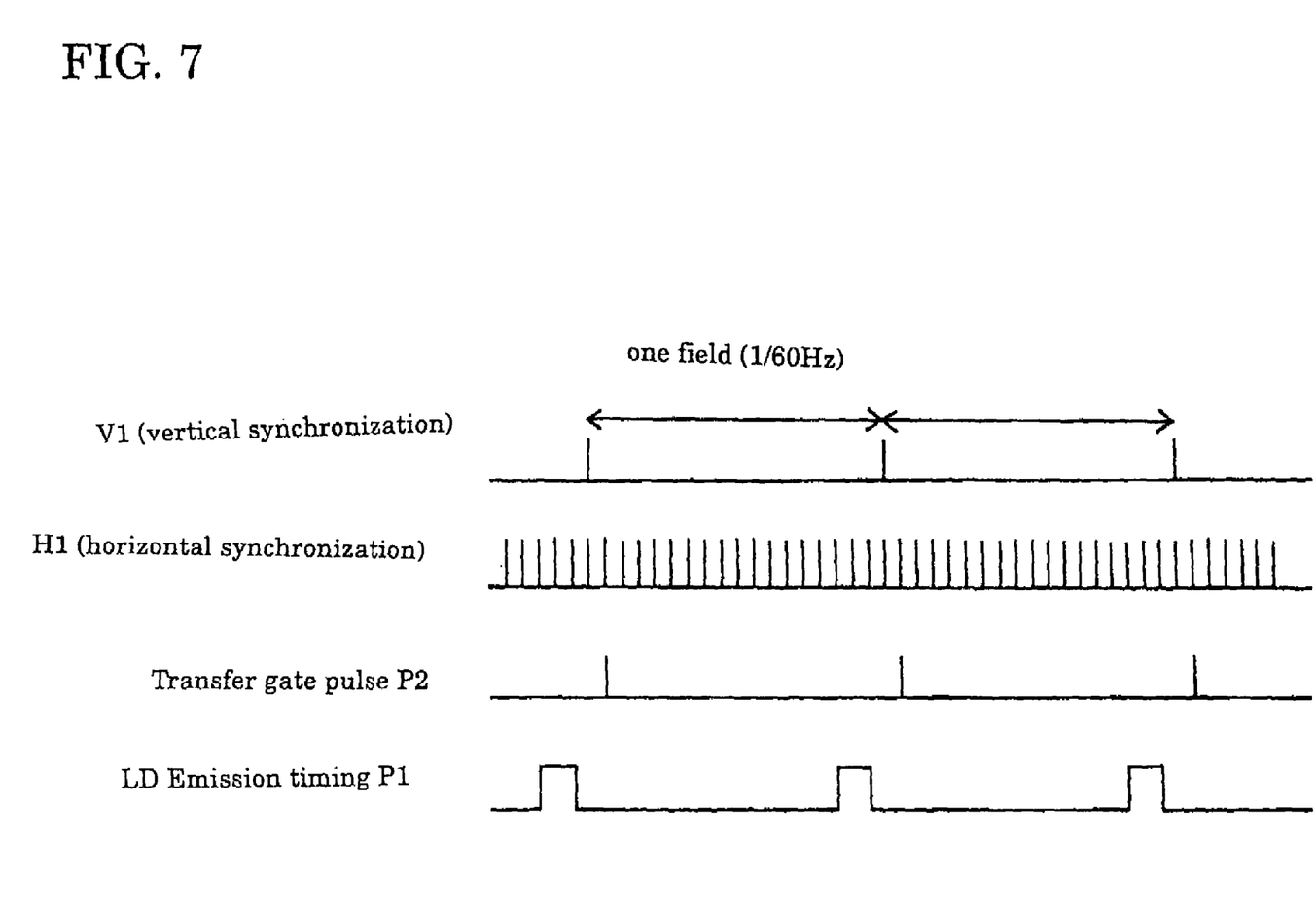
FIG. 7 is a timing chart explaining timing for taking a signal out from an image sensor according to the present invention.

As shown in FIG. 5, a reflection light image MO by the reflection light of measurement light from the corner cube 2 is formed in the area of the image sensor 27. The output of the image sensor 27 is input in a processing circuit 37 as shown in FIG. 6. The processing circuit 37 comprises a central processing device 38 as arithmetic means and a circuit for generating a timing signal 39. The circuit 39 outputs an emission timing pulse signal P1 shown in FIG. 7 toward a laser diode driver circuit 40, and also outputs a vertical synchronization signal V1, a horizontal synchronization signal H1, and a transfer gate pulse signal P2 toward a driver circuit 41.

Light of a laser diode 21 is emitted once in one field by the laser diode driver circuit 40. The driver circuit 41 scans each pixel in the image sensor 27 based on the vertical synchronization signal V1, the horizontal synchronization signal H1, and the transfer gate pulse signal P2.

The output signal (quantity of light signal or luminous signal) of each pixel is input in a sample hold circuit 42, and is amplified by an amplification circuit 43, and then is input in an A/D conversion circuit 44. The A/D conversion circuit 44 outputs the quantity of light signal of each pixel as 8 bit data toward a flame memory or a first storing portion 45 as storing portion, and also outputs toward an edge position detecting portion 46.

This edge position detecting portion or a second storing portion 46 detects the beginning edge position and end edge position of the reflection light image MO every horizontal scanning line in the image sensor 27, and stores data as binarization data at each field.

Figure 8:
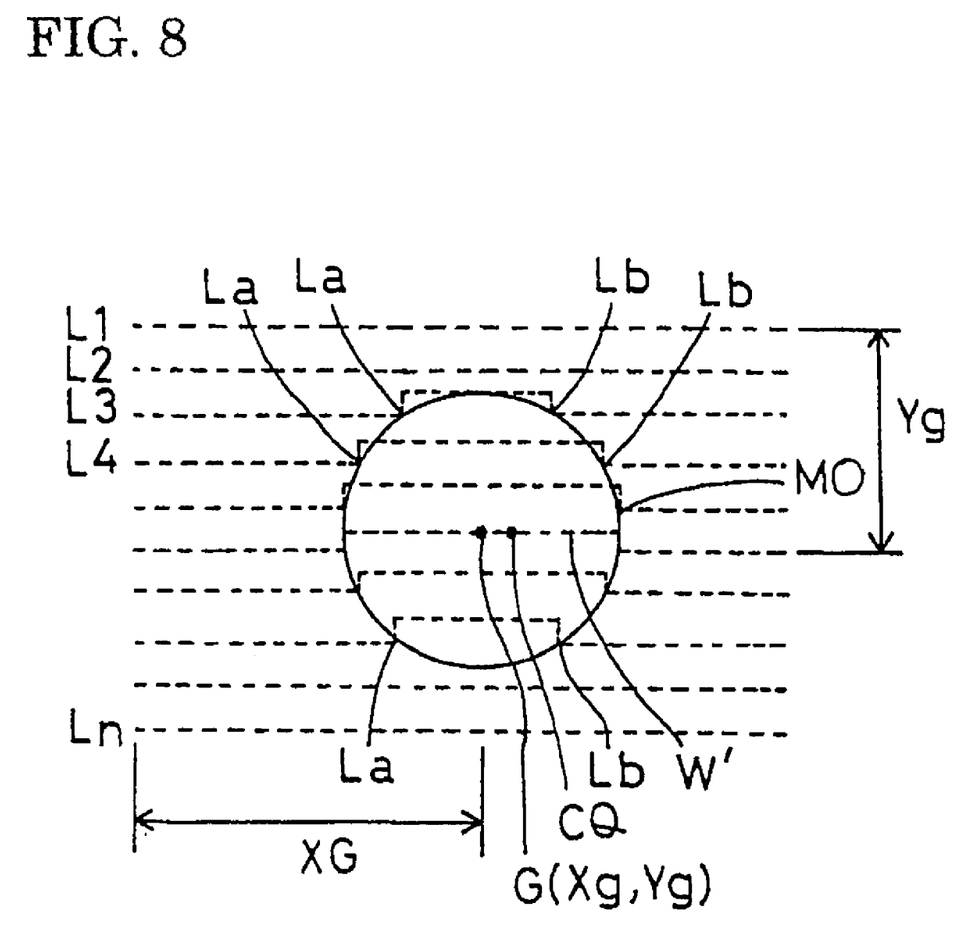
FIG. 8 is an explanation view showing an example for detecting method of a reflection light image which is reflected on an image sensor.

In other words, as shown in FIG. 8, the edge position detecting portion 46 detects a position of pixel corresponding to the beginning edge La and a position of pixel corresponding to an end edge Lb of the reflection light image MO for each of horizontal lines L1 to Ln in the image sensor 27.

The central processing device 38 reads out the quantity of light data of pixel existed in each range from the beginning edge La to the end edge Lb in the edge position detecting portion 46 at each horizontal scanning line, and based on this quantity of light signal, a calculation for a position of the weighted average G (Xg, Yg) is carried out based on the following arithmetic expression.

TABLE 1

$$Xg = \frac{\sum x \cdot d(x, y)}{S}$$

$$Yg = \frac{\sum y \cdot d(x, y)}{S}$$

$$S = \sum \cdot d(x, y)$$

d (x, y): quantity of light data of pixel in x, y positions
S is the area of reflection light image MO
(total quantity of light data of pixel existed in the reflection light image MO)
X: horizontal position
Y: vertical position The central processing circuit 38, based on the position of the weighted average G (Xg, Yg) which is obtained by this way, outputs a rotation control signal toward the rotation mechanism so as to turn the surveying machine body 8 to the corner cube 2. In other words, the surveying machine body 8 is rotated and controlled so as that the position of the weighted average G of the reflection light image MO aligns with the center CQ of the image sensor 27.

In the embodiment of the present invention, it is configured that the measurement light is illuminated to the reflector, but it can be configured that the reflector is scanned by the measurement light.

According to the present invention, an automatic tracking apparatus for a reflector even thought an illumination portion for illuminating measurement light toward a reflector and a light receiving portion having an image sensor for receiving a reflection light image of the measurement light illuminated toward the reflector are disposed in a surveying machine body, the automatic tracking apparatus can carry out tracking without being disturbed.

Moreover, tracking accuracy can be improved because tracking of a reflector can be conducted by obtaining a position of the gravitational center of a reflection light image.

In other words, in a conventional tracking apparatus for a reflector, there is 10 seconds of tracking error as an angle, but in the present invention, the tracking error can be reduced to several seconds' error.

What is claimed is:

1. An automatic tracking apparatus for a reflector comprising:
   a surveying machine body;
   an illumination portion disposed in said surveying machine body for illuminating a measurement light toward a reflector;
   a light receiving portion which is disposed in said surveying machine body and which has an image sensor for receiving a reflection light image of the measurement light illuminated toward said reflector;
   an arithmetic portion for calculating a position of the reflection light image from said reflector in an area of said image sensor based on a received light of said image sensor;
   a rotation mechanism for rotating said surveying machine body in horizontal and vertical directions so as to position said reflector on a light receiving optical axis of said light receiving portion based on the position obtained by said arithmetic portion;
   a storing portion for storing a quantity of light at each pixel in said image sensor; and
   an edge position detecting portion for detecting a beginning edge position and an end edge position of said reflection light image at each scanning line in said image sensor,
   wherein said automatic tracking apparatus reads out the quantity of light at each pixel from said storing portion, and obtains a width between said beginning edge position and said end edge position at each scanning line after calling out the positions from said edge position detecting portion, and decides the scanning line corresponding to the widest line as the position of the weighted average in the horizontal direction, and calculates the position of the weighted average in the vertical direction of the reflection light image based on the quantity of light of the pixel which exists between said beginning edge position and said end edge position in the scanning line corresponding to the widest line.

2. An automatic tracking apparatus for a reflector comprising:
   a surveying machine body;
   an illumination portion disposed in said surveying machine body, for illuminating a measurement light toward a reflector;
   a light receiving portion which is disposed in said surveying machine body and which has an image sensor for receiving the measurement light from said reflector;
   an arithmetic portion for calculating a position of a reflection light image from said reflector in an area of said image sensor based on a received light of said image sensor;
   a rotation mechanism for rotating said surveying machine body in horizontal and vertical directions so as to position said reflector on a light receiving optical axis of said light receiving portion based on the position obtained by said arithmetic portion;
   a first storing portion for storing a quantity of received light of the measurement light from said reflector in scanning; and
   a second storing portion for storing said quantity of received light after binarizing,
   wherein said automatic tracking apparatus reads out the quantity of light at each pixel from said first storing portion and said second storing portion, and obtains a width between said beginning edge position and said end edge position at each scanning line after calling out the positions from said edge position detecting portion, and decides the scanning line corresponding to the widest line as the position of the weighted average in the horizontal direction, and calculates the position of the weighted average in the vertical direction of the reflection light image based on the quantity of light of the pixel which exists between said beginning edge position and said end edge position in the scanning line corresponding to the widest line.

3. An automatic tracking apparatus for a reflector according to claim 1, further comprising a distance measuring light illumination portion for illuminating a distance measuring light toward said reflector, wherein said automatic tracking apparatus drives said rotation mechanism according to the calculated position of the weighted average to rotate said surveying machine body so as to face said reflector and performs distance determination according to a reflected distance measuring light reflected from said reflector.

4. An automatic tracking apparatus for a reflector according to claim 3, wherein said distance measuring light has a wave length different from that of said measurement light.

5. An automatic tracking apparatus for a reflector according to claim 2, further comprising a distance measuring light illumination portion for illuminating a distance measuring light toward said reflector, wherein said automatic tacking apparatus drives said rotation mechanism according to the calculated position of the weighted average to rotate said surveying machine body so as to face said reflector and performs distance determination according to a reflected distance measuring light reflected from said reflector.

6. An automatic tracking apparatus for a reflector according to claim 5, wherein said distance measuring light has a wave length different from that of said measurement light.

* * * * *